United States Patent
Jang et al.

(10) Patent No.: US 7,350,125 B2
(45) Date of Patent: Mar. 25, 2008

(54) HARQ METHOD FOR GUARANTEEING QOS IN A WIRELESS COMMUNICATION SYSTEM

(75) Inventors: Kyung-Hun Jang, Suwon-Si (KR); Chang-Woo Seo, Suwon-si (KR); Jin-Youn Cho, Seoul (KR); Ki-Ho Lee, Daejon (KR); Dong-Ho Cho, Daejon (KR); Tae-Soo Kwon, Daejon (KR); Ae-Ri Lim, Daejon (KR); Ki-Hyun Pyun, Daejon (KR); Kyung-Ho Hwang, Daejon (KR)

(73) Assignees: Samsung Electronics Co., Ltd. (KR); Korea Advanced Institute of Science and Technology (KR)

(*) Notice: Subject to any disclaimer, the term of this patent is extended or adjusted under 35 U.S.C. 154(b) by 507 days.

(21) Appl. No.: 10/982,428

(22) Filed: Nov. 5, 2004

(65) Prior Publication Data

US 2005/0122898 A1 Jun. 9, 2005

(30) Foreign Application Priority Data

Nov. 5, 2003 (KR) .................. 10-2003-0078138

(51) Int. Cl.
*H04L 1/18* (2006.01)
*G08C 25/02* (2006.01)

(52) U.S. Cl. ..................................... 714/748
(58) Field of Classification Search ................. 714/748
See application file for complete search history.

(56) References Cited

U.S. PATENT DOCUMENTS 7,000,174 B2 * 2/2006 Mantha et al. .............. 714/790
7,068,627 B2 * 6/2006 Koo et al. .................. 370/333

* cited by examiner

*Primary Examiner*—Shelly Chase
(74) *Attorney, Agent, or Firm*—The Farrell Law Firm, PC

(57) ABSTRACT

An HARQ method for guaranteeing a QoS in a wireless communication system is provided. In a transmitting apparatus using a HARQ for transmitting packet data in a wireless communication system, a retransmission controller determines the size of redundancy information for correcting transmission errors in packet data, and a transmitter transmits the redundancy information of the determined size upon request for a retransmission of the packet data. Transmission of redundancy information of a variable size at each retransmission satisfies the QoS required for each user, maximizes a data throughput, and allows for the efficient reception of an ACK or a NACK for the redundancy information.

24 Claims, 10 Drawing Sheets

HARQ METHOD FOR GUARANTEEING QOS IN A WIRELESS COMMUNICATION SYSTEM

PRIORITY

This application claims priority under 35 U.S.C. § 119 to an application entitled "HARQ Method for Guaranteeing QoS in a Wireless Communication System" filed in the Korean Intellectual Property Office on Nov. 5, 2003 and assigned Serial No. 2003-78138, the contents of which are incorporated herein by reference.

BACKGROUND OF THE INVENTION

1. Field of the Invention

The present invention relates generally to a HARQ (Hybrid Automatic Repeat Request) for packet data transmission, and in particular, a method and apparatus for optimizing a data throughput and a QoS (Quality of Service) in the transmission of packet data and redundancy information.

2. Description of the Related Art

Wireless communication systems have developed into high-speed, high-quality wireless data packet communication systems that have expanded beyond providing a voice service into offering data services and multimedia services. Standardization of a HSDPA (High Speed Downlink Packet Access) and 1×EV-DV (Evolution-Data and Voice) undertaken mainly by the 3GPP ($3^{rd}$ Generation Partnership Project) and 3GPP2 ($3^{rd}$ Generation Partnership Project 2) is a major effort made to find a solution to provide high-quality wireless data packet transmission services at a high speed of 2 Mbps or above in 3G wireless communication systems. $4^{th}$ generation (4G) wireless communication systems aim to provide even higher-speeds and higher-quality multimedia services.

Obstacles to high-speed, high-quality data service in the wireless communication systems originate from the channel environment. The channel environment varies often due to white noise, the change of received signal power caused by fading, shadowing, Doppler effects caused by the movement of a mobile station (MS) and its frequent speed changes, and interference from other users and multi-path signals. Hence, to provide the high-speed wireless data packet service, advanced technology other than that used for the existing $2^{nd}$ generation (2G) or 3G wireless communication systems is required which can improve the ability to change channels. Although high power control in the conventional wireless communication systems enhances the ability to adapt to the channel change, the 3GPP and 3GPP2, which is carrying out the standardization work on the high-speed data packet transmission system, commonly address an AMCS (Adaptive Modulation and Coding Scheme) and an HARQ.

HARQ is a retransmission control scheme adopted when a retransmission of a transmitted packet having errors is requested to compensate for the errors. The HARQ can be divided into CC (Chase Combining) and IR (Incremental Redundancy). Generally, HARQ with CC is called Type I, while HARQ with IR is called Type II.

The CC scheme simply transmits the same packet as an initial transmission packet. A receiver combines the initial transmission packet buffered in a buffer with the retransmission packet in a predetermined method. The resulting increased reliability of coded bits input to a decoder leads to a performance gain in the wireless communication system. The combining of the same two packets is almost equivalent to repeated coding in terms of effect. A performance gain of about 3 dB is achieved on an average.

The IR scheme is one in which a different packet having information bits and redundant bits is transmitted rather than the same initial transmission packet. Since decoding is performed on the new bits as the well as initially transmitted bits, a coding gain is increased, thereby improving decoding performance. It is well known in the field of coding theory that a performance gain at a low code rate is greater than that by repeated coding. Taking into consideration only a performance gain, the IR scheme usually offers better performance than the CC scheme.

Users assuming diverse traffic properties under diverse channel environments must share resources to efficiently utilize limited radio resources. There is a need for efficient methods of requesting the common resources. Especially for efficient provisioning of services in a wide range of QoS, the services are to be provided in different manners according to priority such as their QoS classes and user levels, ensuring a maximum throughput on the whole.

However, the conventional HARQ techniques differ only in the contents of retransmission packets but cannot control the size of the retransmission packets. Consequently, they do not guarantee a given QoS for each data packet, that is, in terms of blocking rate and delay.

SUMMARY OF THE INVENTION

An object of the present invention is to substantially solve at least the above problems and/or disadvantages and to provide at least the advantages below. Accordingly, an object of the present invention is to provide an HARQ method for effectively providing services with different priority levels.

Another object of the present invention is to provide a method in an MS (Mobile Station) and a BS (Base Station) for effectively providing services with different priority levels.

A further object of the present invention is to provide a method of transmitting retransmission data of a variable size and receiving a response for the retransmission data to effectively provide services with different priority levels.

Still another object of the present invention is to provide a method of controlling the size of a retransmission packet according to a service priority level in an HARQ system.

The above objects are achieved by providing an HARQ method for guaranteeing a QoS in a wireless communication system.

According to an aspect of the present invention, in an HARQ method for transmitting packet data in a wireless communication system, the size of redundancy information for correcting transmission errors in packet data is determined. Upon request for a retransmission of the packet data, the redundancy information of the determined size is transmitted.

According to another aspect of the present invention, in a transmitting apparatus using a HARQ for transmitting packet data in a wireless communication system, a retransmission controller determines the size of redundancy information for correcting transmission errors in packet data, and a transmitter transmits the redundancy information of the determined size upon request for a retransmission of the packet data.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

Data packets undergo framing according to the transmission media and service features in most hierarchical communication systems. The framing is essential to define functional boundaries between higher layers and lower layers in data transmission on a transmission medium.

Figure 1:
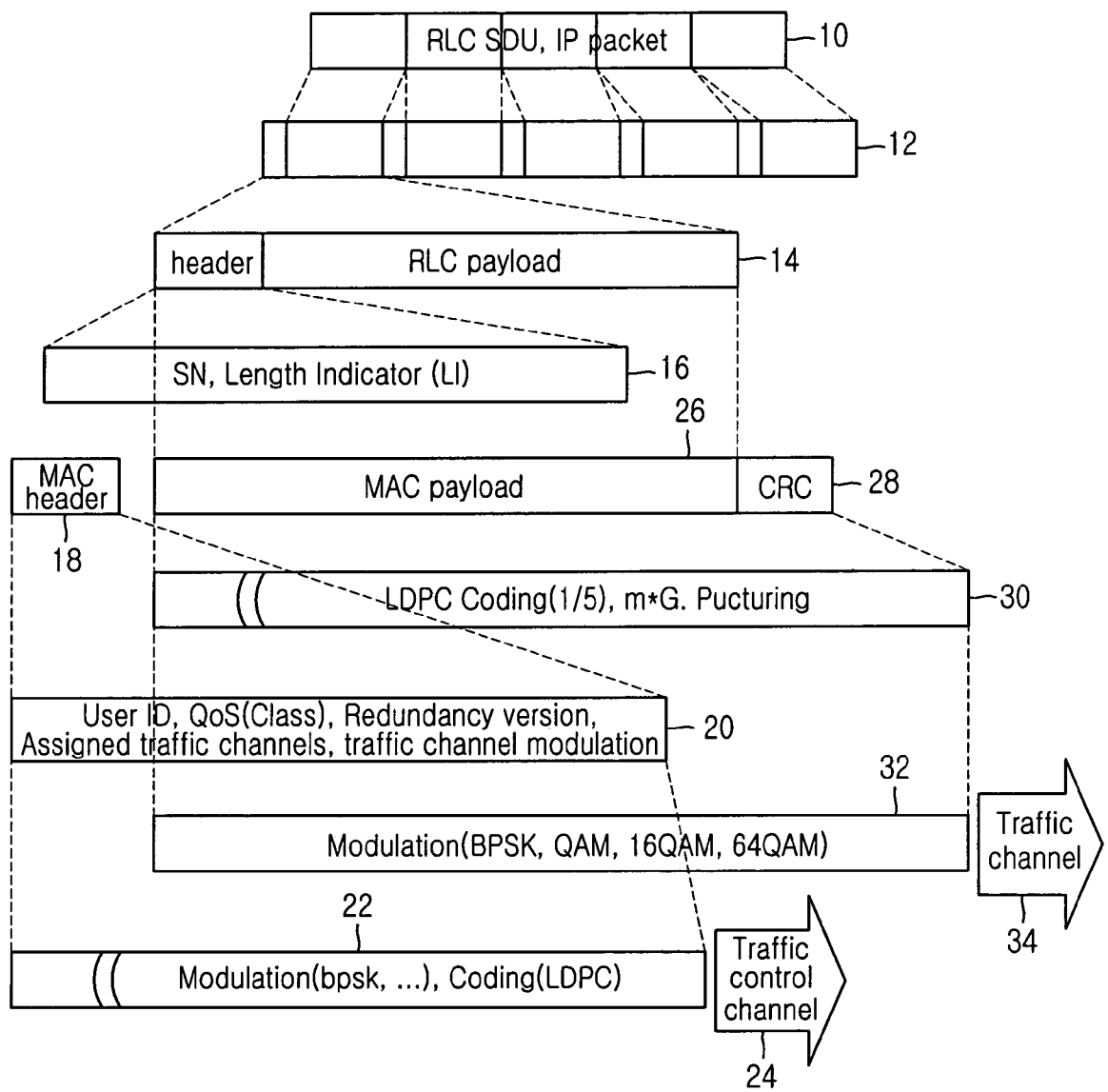
FIG. 1 is a diagram illustrating a layered data structure in a wireless communication system.

FIG. 1 illustrates a layered data structure in a wireless communication system. The demonstrated data structure is for a UTRAN (UMTS Terrestrial Radio Access Network) in a UMTS (Universal Mobile Telecommunications Services) system which is one of 3G mobile communication systems.

Referring to FIG. 1, reference numeral 10 denotes an SDU (Service Data Unit) in the form of an IP (Internet Protocol) packet in Layer 3, that is, an RLC (Radio Link Control) layer. The RLC SDU 10 is segmented into a plurality of data blocks 12 of a size suitable for transmission in a lower layer.

Each of the data blocks 12 includes a header and an RLC payload, as denoted by reference numeral 14. The header has a sequence number (SN) and a length indicator (LI), as denoted by reference numeral 16. The data block 14 becomes a payload for Layer 2, that is, a MAC (Medium Access Control) layer, as denoted by reference numeral 26.

Reference numeral 18 denotes a MAC header. The MAC header includes a user ID (Identification), a QoS (class), a redundancy version, traffic channel assignment information, and traffic channel modulation information, as denoted by reference numeral 20. The MAC header is transmitted on a traffic control channel 24 after LDPC (Low Density Parity Check) coding and BPSK (Binary Phase Shift Keying) modulation as denoted by reference numeral 22.

Meanwhile, a predetermined CRC (Cyclic Redundancy Code) 28 is attached to the MAC payload 26. The MAC payload 26 and CRC 28 is then subject to LDPC coding 30 and modulation 32. The MAC payload 26 is then transmitted on a traffic channel 34 after the LDPC coding 30 and modulation 32.

In the above data structure, coding and modulation are performed in Layer 1, that is, a physical layer. The physical layer supports HARQ for error correction at its level, separately from the higher layers. As stated earlier, the HARQ is a process of, if transmission errors are detected in coded data, retransmitting by a transmitter redundancy information and correcting the transmission errors by combining in a receiver previously received data with the redundancy information. HARQ Type II improves decoding performance by transmitting different redundancy information from initial transmission data.

Figure 2:
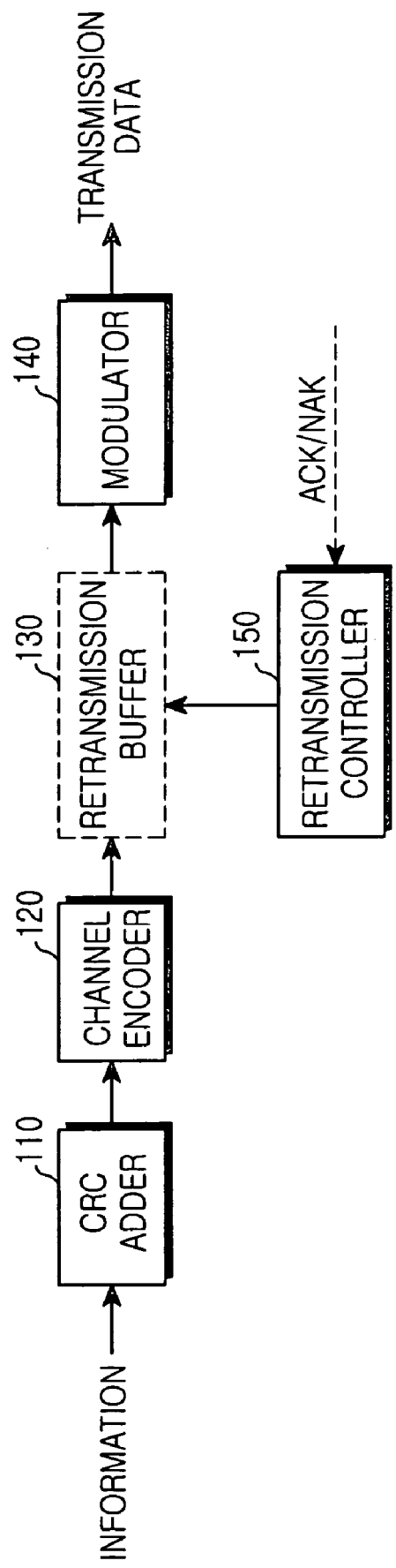
FIG. 2 is a block diagram of a physical layer transmitter in an HARQ system according to the present invention.
Figure 3:
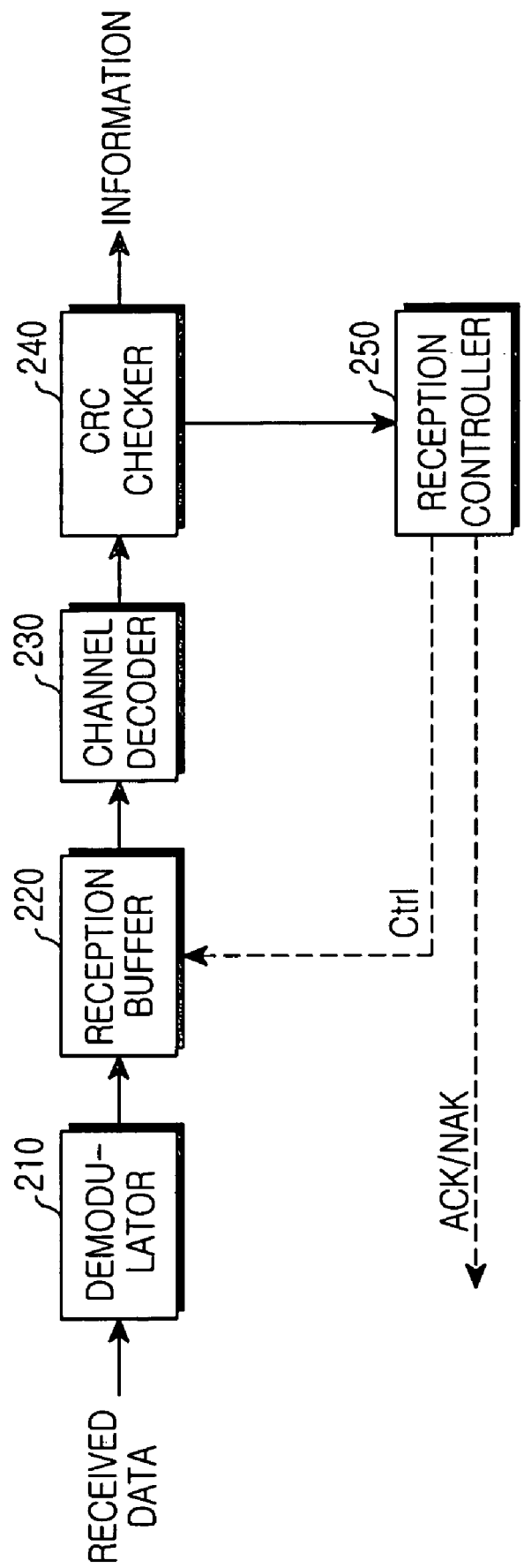
FIG. 3 is a block diagram of a physical layer receiver in the HARQ system according to the present invention.

FIGS. 2 and 3 are block diagrams of a physical layer transmitter and a physical layer receiver, respectively, in an HARQ system according to the present invention. For downlink transmission, the physical layer transmitter is in a BS (Base Station), while the physical layer receiver is in an MS (Module Station). For uplink transmission, the physical layer transmitter is in the MS, while the physical layer receiver is in the BS.

Referring to FIG. 2, a CRC adder 110 adds a CRC (28 in FIG. 1) to user data received from a higher layer (i.e. MAC layer) in units of packets, for error correction. A channel encoder 120 encodes the packet including the CRC at a predetermined code rate. The input to the channel encoder 120 is termed an encoder packet. A stream (referred to as an encoded stream) output from the channel encoder 120 is stored in a retransmission buffer 130. The retransmission buffer 130 outputs requested data under the control of a retransmission controller 150.

The output of the retransmission buffer 130 may contain all of or part of an encoder packet or error correction information for the encoder packet according to the type of an HARQ used. For example, when LDPC coding is used, an encoded stream output for the input of an encoder packet includes systematic bits corresponding to the encoder packet and parity bits corresponding to error correction information for the encoder packet.

Initial transmission data includes at least systematic bits, whereas retransmission data includes parity bits only according to the number of retransmissions, or part of the systematic bits and the parity bits. For instance, redundancy information having different parity bits can be output at each retransmission so as to achieve a higher decoding gain by combining the retransmission data with the initial transmission data at decoding.

A modulator 140 modulates the data received from the retransmission buffer 130 in one of BPSK, QAM (Quadrature Amplitude Modulation), 16 QAM (16-ary QAM), and 64 QAM (64-ary QAM) modulation techniques. While not shown, the modulated data is spread with predetermined spreading codes and transmitted through an antenna.

The retransmission controller 150, which is a feature of the embodiment of the present invention, determines the size of the retransmission data output from the retransmission buffer. The retransmission data is redundancy information transmitted for correcting errors in the initial transmission data. The retransmission data is transmitted until no errors are generated or the count of retransmissions reaches a predetermined maximum value.

The redundancy information may include the same data bits or different data bits at each retransmission according to the type of the HARQ. The data of the redundancy information is beyond the scope of the present invention and thus its detailed description is not provided here. The present invention focuses on the size of the redundancy information and it is to be understood that the redundancy information of a size determined according to the present invention may include data generated according to any known methods.

Referring to FIG. 3, a signal in a carrier frequency band received through a receive antenna is downconverted to a baseband signal and despread with predetermined spreading codes. A demodulator 210 demodulates the despread data in a demodulation method corresponding to a modulation scheme used in the transmitter. A reception buffer 220 discriminately stores the modulated data depending on whether the data is systematic bits or parity bits.

The reception buffer 220 provides its stored data of the same packet ID to a channel decoder 230 under the control of a reception controller 250. The channel decoder 230 decodes the input data at a code rate used in the transmitter and outputs information bits of one packet. The channel decoder 230 attempts to correct errors by combining data with the same packet ID. A CRC checker 240 checks a CRC in the decoded data on a per-packet basis and transmits the CRC result to the reception controller 250. If the packet data is normal, the CRC checker 240 provides the packet data to a higher layer.

HARQ Type II is a link adaptation scheme in which the sum of transmitted redundancy information is determined according to a channel condition. To adapt perfectly to the channel condition, it is preferable to transmit a minimum of redundancy information many times, albeit at the expense of an increased time delay. Accordingly, the present invention determines, at each transmission, the size of redundancy information for guaranteeing the QoS of each packet according to the QoS class.

When transmitting redundancy information due to transmission errors, the transmitter transmits a large amount of redundancy information for a packet of a high QoS class. The QoS class or service priority level refers to service quality in relation to packet transmission delay. A packet requiring a shorter delay or a lower blocking rate has a higher QoS class.

Figure 4A:
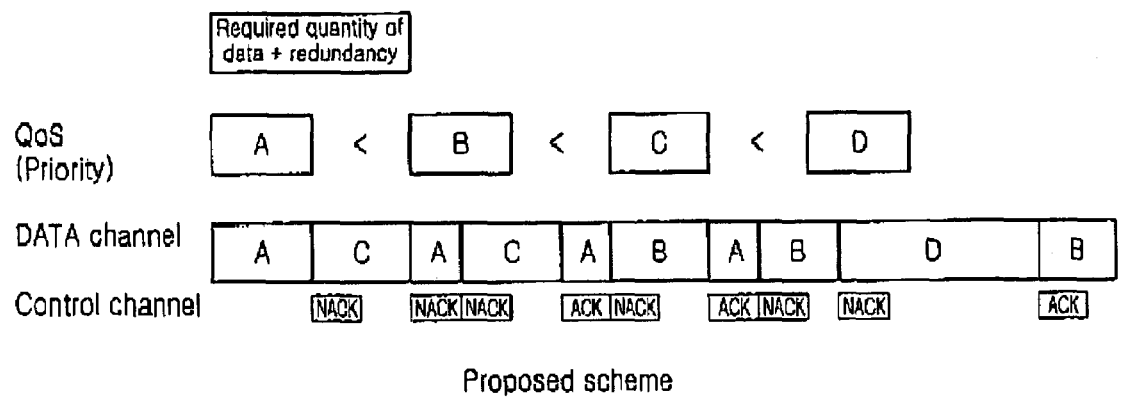
FIG. 4A is a diagram illustrating data transmission in a time domain according to the present invention.
Figure 4B:
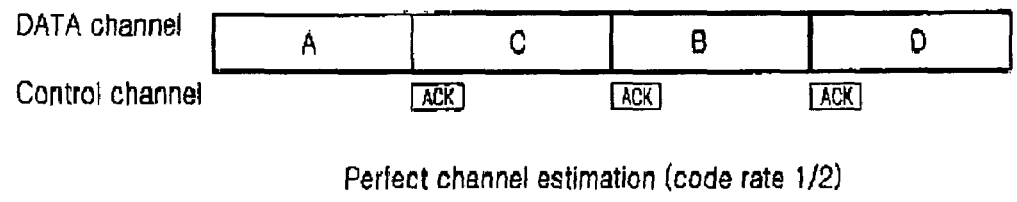
FIG. 4B is a diagram illustrating data transmission on a perfect channel in the time domain.
Figure 4C:
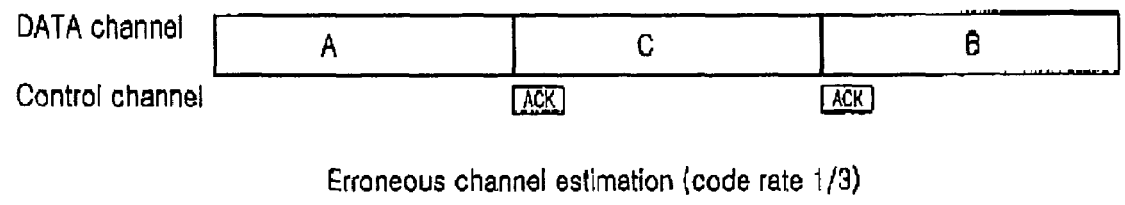
FIG. 4C is a diagram illustrating data transmission on an erroneous channel in the time domain.

FIGS. 4A, 4B and 4C illustrate data transmission in the time domain. FIG. 4A illustrates a repeated transmission of redundancy information for packets A, B, C and D according to the present invention. The packets A, B, C and D have priority levels in the order of A<B<C<D. As illustrated in FIG. 4A, the redundancy information for each packet has a different size at each transmission according to QoS class and time delay.

FIG. 4B illustrates data transmission on a perfect channel. Referring to FIG. 4B, in the ideal case, since redundancy information for each packet has a size twice as large as the packet, all packets can be transmitted faster than in the case illustrated in FIG. 4A. A code rate herein is ½. FIG. 4C illustrates data transmission on an erroneous channel. Referring to FIG. 4C, the redundancy information for each packet is always of the same size irrespective of QoS class or time delay. If the redundancy information is three times greater than the packet in size, the code rate is ⅓.

Figure 5:
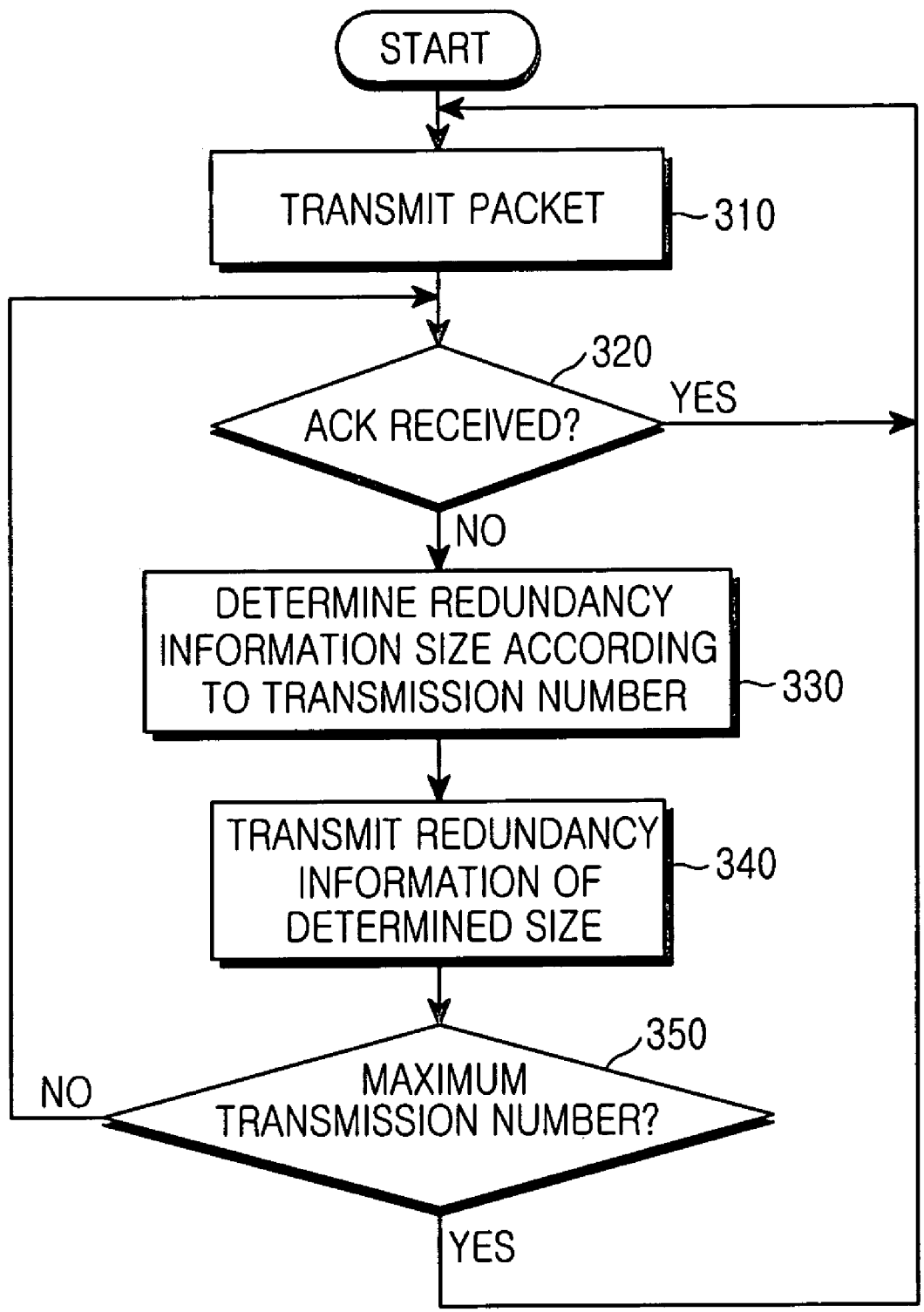
FIG. 5 is a flowchart illustrating an HARQ operation according to a preferred embodiment of the present invention.

FIG. 5 is a flowchart illustrating an HARQ operation according to a preferred embodiment of the present invention.

Referring to FIG. 5, after transmitting one packet of user data in step 310, the transmitter determines if an acknowledgement (ACK) for the packet has been received on an ACK channel in step 320. Upon receipt of the ACK, the transmitter returns to step 310 and transmits the next packet. On the other hand, when the transmitter fails to receive the ACK or receives a non-acknowledgement (NACK) on the ACK channel, the transmitter proceeds to step 330.

In step 330, the transmitter determines the size of redundancy information according to the number of redundancy information transmissions that have occurred so far. The size of the redundancy information is determined according to the QoS class of the user data. The QoS class is expressed as an allowable time delay for the user data. In step 340, the transmitter transmits the redundancy information of the determined size.

The transmitter determines if the number of redundancy information transmissions for the packet has reached a maximum transmission number in step 350. The maximum transmission number is set to prevent endless repetition of transmission of the redundancy information. If the number of redundancy information transmissions reaches the maximum transmission number, the transmitter returns to step 310 and transmits the next packet, otherwise, the transmitter determines if an ACK for the transmitted redundancy information has been received in step 320.

As described before, the size of redundancy information for a packet depends on the QoS class of the packet. Because the QoS class is not variable during packet transmission, it is possible to determine the size of redundancy information in advance for each transmission number each time a packet is generated.

A coded stream stored in the retransmission buffer 130 after encoding in the encoder 120 is segmented in the transmitter into a plurality of redundancy units. A redundancy unit is a minimum transmission unit. At each retransmission, the retransmission buffer 130 outputs a predetermined number of redundancy units as redundancy information according to the number of redundancy information transmissions so far under the control of the retransmission controller 150. Thus, the size of the redundancy information is equivalent to the number of the redundancy units.

Let $D_o^n$ denote the case of not generating errors after transmitting redundancy information n times, $D_u^n$ denote the case of generating errors but not detecting the errors by a receiver after transmitting redundancy information n times, and $D_d^n$ denote the case of detecting errors after transmitting redundancy information n times. The probabilities of these cases are in the following relationship $$P(D_o^n)+P(D_u^n)+P(D_d^n)=1 \qquad (1)$$

Assuming that the number of redundancy information transmissions is not limited for one packet, the transmission efficiency of the packet data can be maximized by minimizing the size of all retransmitted data. An average transmission delay is computed by an average transmission number Tr(=1 (first transmission)+the number of redundancy information transmissions). On the assumption that $P(D_u^n)=0$, $$T_r=1+P(D_d^1)+P(D_d^3)+P(D_d^4)+\ldots \qquad (2)$$

where $P(D_d^n)$ is a probability of detecting errors after n-times transmission of redundancy information.

In real implementation, however, the maximum number of transmissions for one packet is limited by an allowable delay for a packet, D. Let the transmission delay of each redundancy information be a RTT (Round Trip Time) and its maximum number be N. Then, $$N = \left\lfloor \frac{D}{RTT} \right\rfloor.$$

$\lfloor\ \rfloor$ is a symbol indicating an floor operation for extracting an integer part.

The RTT is defined as the time required from reception of an ACK or NACK for a transmitted packet or transmitted redundancy information until transmission of the next redundancy information or a new packet.

If transmission of a packet/redundancy information and reception of an ACK/NACK are performed in a TDD (Time Division Multiplexing), a BS can receive the ACK/NACK from an MS in a predetermined time period on the uplink shortly after transmitting the packet/redundancy information on the downlink. In the TDD system, it is ideal that the RTT is the sum of a downlink frame length $T_{downlink}$ and an uplink frame length $T_{uplink}$ ($RTT=T_{downlink}+T_{uplink}$). In practice, however, time consumption is involved between the downlink and uplink frames for the BS to process the packet/redundancy information and generate the ACK/NACK. Hence, the RTT is the sum of the downlink frame length $T_{downlink}$, the uplink frame length $T_{uplink}$, downlink processing time $TP_{downlink}$, and uplink processing time $TP_{uplink}$ ($RTT=T_{downlink}+T_{uplink}+TP_{downlink}+TP_{uplink}$).

If transmission of the packet/redundancy information and reception of the ACK/NACK are performed in a FDD (Frequency Division Multiplexing), the BS must process the ACK/NACK within a very short time. Thus, the RTT is determined only according to the transmission timing interval (TTI) of the ACK/NACK. When the ACK/NACK continuously exists on the ACK channel, the RTT is at least greater than the sum of TTI, propagation time and processing time (RTT>TTI+propagation time+processing time).

Considering the maximum transmission number N, a probability of detecting errors after transmitting a packet N times is given as $$P(D_d^N) \qquad (3)$$

If the error probability $P(D_d^N)$ is greater than a packet blocking rate required according to a QoS class, two or more redundancy units can be transmitted as redundancy information. If the size of a redundancy unit is $R_{min}$, the size of the redundancy information is $R_{min} \times n$ (n is a natural number equal to or greater than 2).

In the present invention, $$N \text{ is } \left\lfloor \frac{D}{RTT} \right\rfloor$$

and the size of redundancy information is determined such that an allowable reference blocking rate $B_r$ is satisfied and throughput is maximized. The throughput is a ratio of the size of a transmission packet to the total amount of transmitted data, determined by $$\eta = \frac{k}{R_{min} \cdot \alpha} \qquad (4)$$

where k is the size of the transmission packet, $R_{min}$ is the minimum amount of transmittable data (i.e. the size of a redundancy unit), and $\alpha$ is an average number of redundancy units that are transmitted. Here, $$\alpha = x_1 + x_2 \cdot P(D_d^{x_1}) + x_3 \cdot P(D_d^{x_2}) \ldots x_N \cdot P(D_d^{x_{N-1}}) \qquad (5)$$

where $x_i$ (i=1, 2, ..., N) is the number of redundancy units included in an $i^{th}$ transmitted redundancy information. If an $(i-1)^{th}$ transmission is successful, the $i^{th}$ transmission is not carried out. Therefore, $R_{min} \times \alpha$ is the average amount of transmitted data (i.e. an average redundancy information size).

A probability of retransmitting redundancy information within the allowable delay D a plurality of times and failing in transmission must be less than the packet blocking rate $B_r$ determined according to the QoS class of the packet. Therefore, the following equation must be satisfied.

$$B_y \geq P(D_d^{x_N}) \qquad (6)$$

Finally, $x_1, x_2, \ldots, x_N$ that satisfy Equation (6) and maximize $\eta$ in Equation (4) are redundancy information sizes that optimize the data throughput and the packet blocking rate.

A failure probability for each transmission number, $P(D_d^{x_1}), P(D_d^{x_2}), \ldots P(D_d^{x_{N-1}})$ is empirically obtained for various channel conditions according to a given encoding method such as an LDPC coding or a turbo coding. The channel condition covers a SNR (Signal to Noise Ratio), received signal strength, channel response characteristics, etc. Hence, the transmitter, having a mapping table listing the probability values versus the channel conditions, determines the size of redundancy information to be transmitted with respect to each transmission number whenever it is to transmit a packet. The transmitter supposes that the channel condition does not change significantly within the allowable packet delay D.

Figure 6:
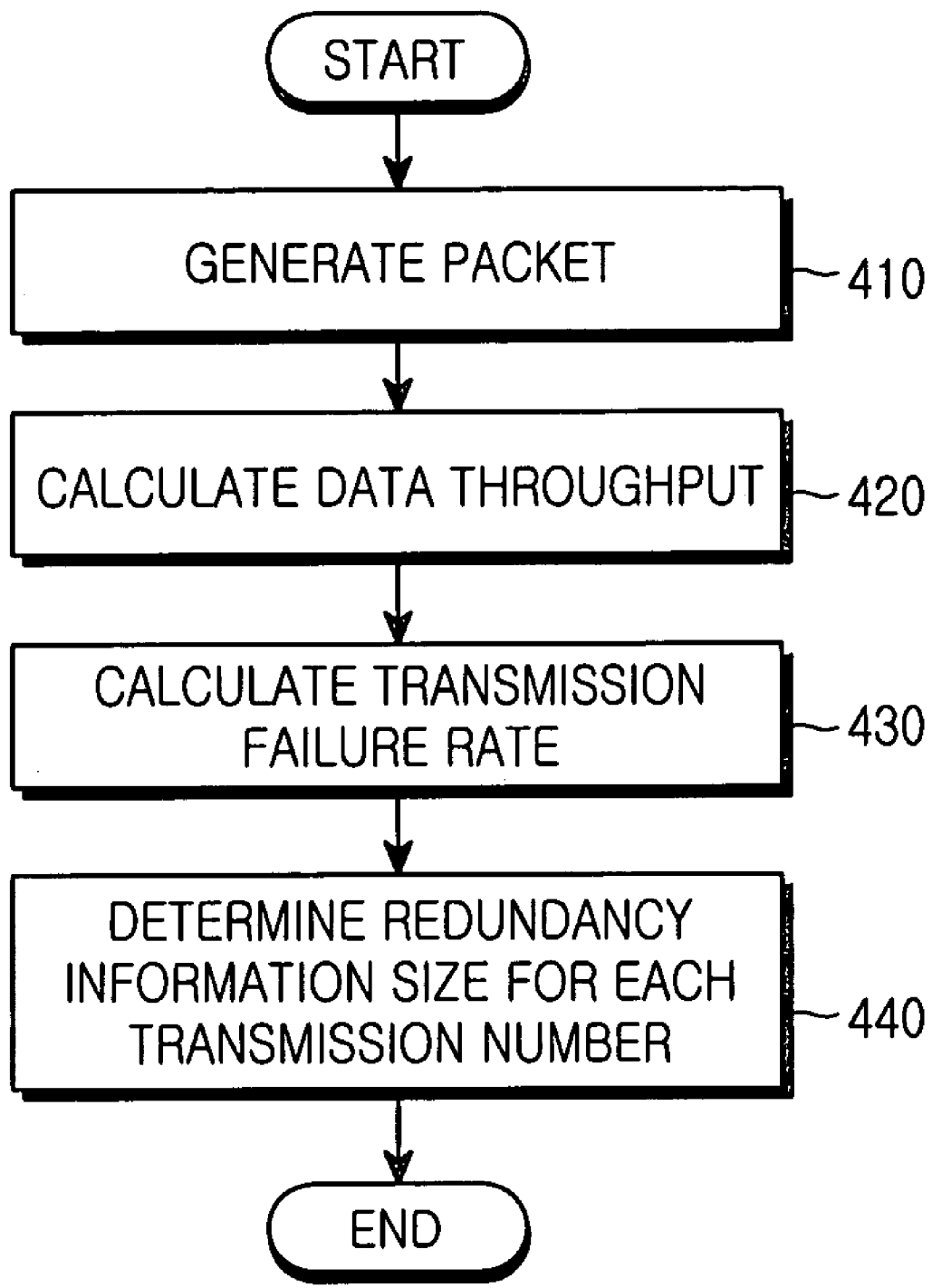
FIG. 6 is a flowchart illustrating an operation for calculating the size of redundancy information according to the number of transmissions according to the preferred embodiment of the present invention.

FIG. 6 is a flowchart illustrating an operation for calculating a redundancy information size for each transmission number according to the preferred embodiment of the present invention.

Referring to FIG. 6, upon generation of a packet to be transmitted in step 410, the transmitter calculates using Equation (4) a data throughput using the size of the packet and an average transmission amount in step 420. The average transmission amount is determined by an error probability for each transmission number. The error probability for each transmission number is empirically obtained according to an encoding method such as the LDPC coding or the turbo coding, and a channel condition.

In step 430, the transmitter calculates using Equation (6) a transmission failure probability using the error probability. The transmission failure probability refers to a probability of failing to receive an ACK despite transmission of redundancy information a predetermined maximum number of times. The transmitter calculates the size of redundancy information for each transmission number such that the calculated data throughput is maximized and the calculated transmission failure rate is equal to or less than a predetermined blocking rate for each packet, in step 440.

In the above-described preferred embodiment of the present invention, since the size of the redundancy information varies at each transmission, the receiver must be informed of the redundancy information size to normally detect the redundancy information. The redundancy information size is notified by a control channel that typically delivers transmission parameters of a traffic channel, such as a MAC header.

Figure 7A:
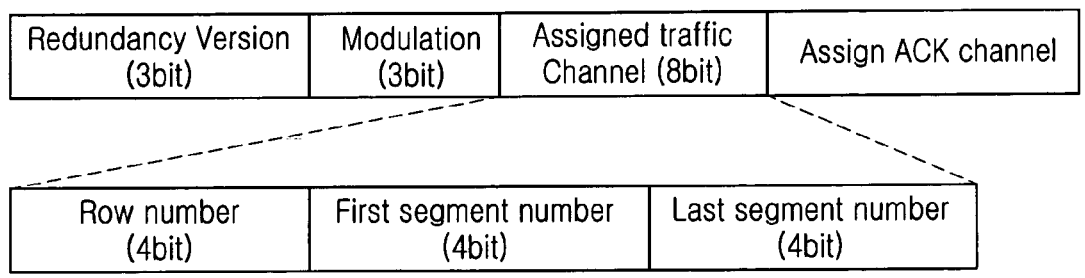
FIGS. 7A and 7B are diagrams illustrating an embodiment of a control channel structure that notifies the size of redundancy information according to the present invention.
Figure 7B:
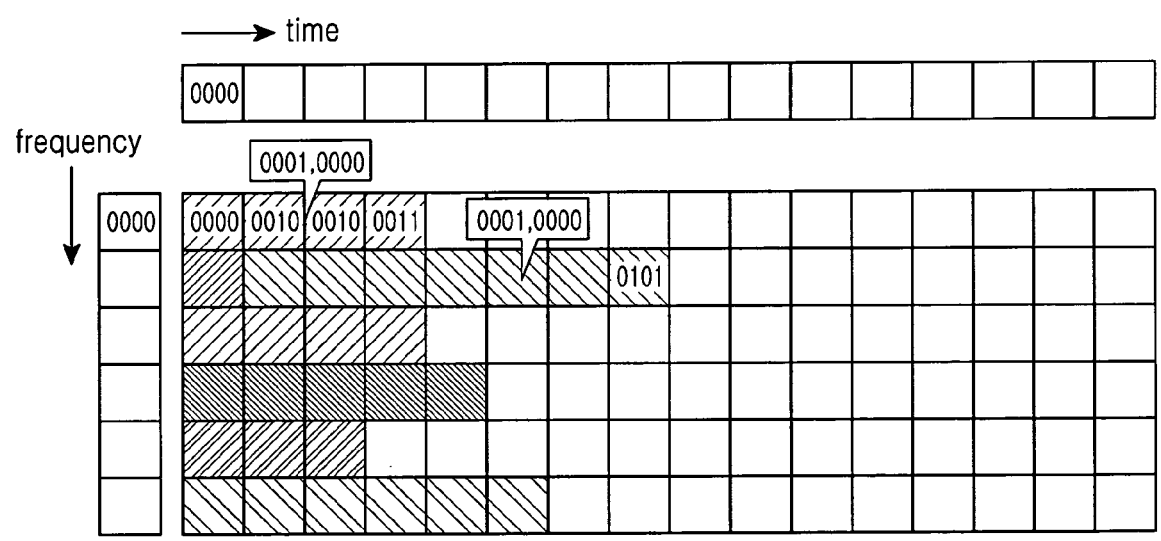

FIGS. 7A and 7B illustrates an embodiment of a control channel structure that notifies a redundancy information size. An OFDM (Orthogonal Frequency Division Multiplexing) communication system, which transmits data on sub-carriers in a plurality of time periods, is use for purposes of illustration.

FIG. 7A illustrates the structure of a data frame of the control channel. The control channel delivers 3-bit Redundancy Version, 3-bit Modulation, and 8-bit Assigned Traffic Channel, and Assign ACK Channel. The Modulation indicates a modulation scheme used for data transmission on a traffic channel. The Assigned Traffic Channel indicates the size and position of redundancy information, and the Assign ACK Channel indicates the size and position of an ACK/NACK.

In the OFDM system, the size and position of redundancy information in a traffic channel can be represented by sub-carriers and time periods at each transmission. A plurality of sub-carriers in a frequency hopping pattern form rows. Each row is divided into a plurality of segments, each segment representing a time period in which one redundancy unit of size $R_{min}$ can be transmitted. Thus, the Assigned Traffic Channel may include a 4-bit row number, a 4-bit first segment number, and a 4-bit last segment number.

FIG. 7B illustrates an embodiment of the size and position of a portion of a traffic channel assigned to the redundancy information in an OFDM frame. A horizontal axis represents the time domain and a vertical axis represents the frequency domain in an illustrated logical channel frame. To notify the receiver of the positions of assigned traffic segments, the BS tells the MS the first and last time-domain segments and a frequency-domain row number. The BS assigns unused traffic segments to the MS, starting with the leftmost segment. The configuration of the Assigned Traffic Channel easily indicates an assigned traffic channel to the MS in a small number of bits, thereby maximizing granularity.

As stated earlier, the ACK/NACK is transmitted on the ACK channel corresponding to the traffic channel. When the size of redundancy information is variable for each user, it is inefficient to use the ACK channel mapped to the traffic channel on a one-to-one correspondence, that is, the ACK channel slaved to the traffic channel. Therefore, the time-domain position of the ACK channel is assigned at each transmission of redundancy information, and information about the ACK channel assignment (Assign ACK Channel) is transmitted on the control channel.

Figure 8:
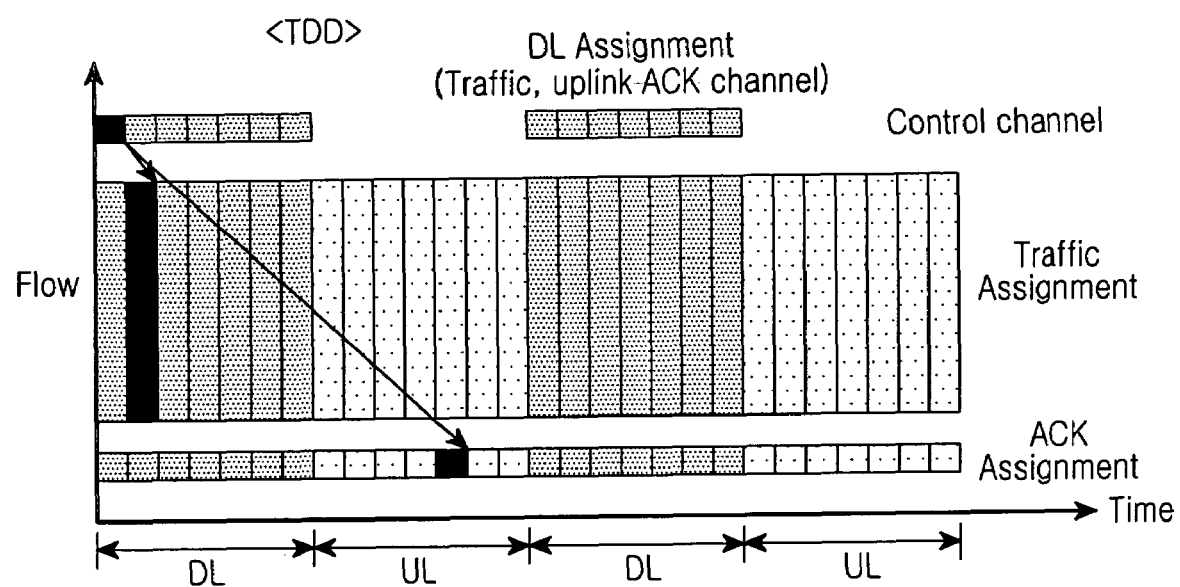
FIGS. 8 and 9 are diagrams illustrating embodiments of synchronous assignment of an ACK channel in TDD and in FDD, respectively according to the present invention.
Figure 9:
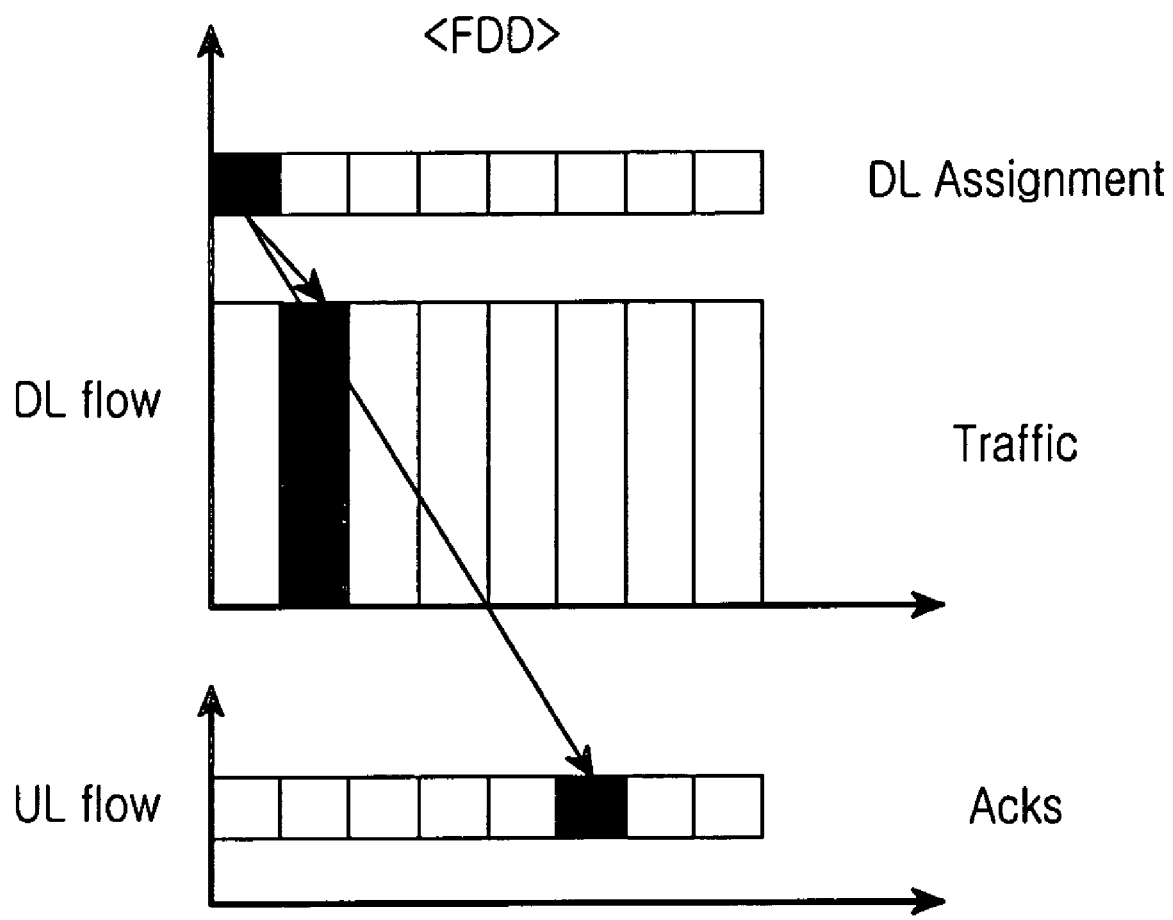

FIGS. 8 and 9 illustrate embodiments of synchronous ACK channel assignment in a TDD and a FDD system, respectively, according to the present invention. An appropriate mapping relationship between a packet/redundancy information and an ACK/NACK is illustrated which minimizes downlink assignment information directed from the transmitter to the receiver.

Referring to FIG. 8, DL represents a time period assigned to the downlink and UL represents a time period assigned to the uplink. Downlink assignment information delivered on the control channel includes information about mapping between the position of an assigned traffic channel and the position of an assigned ACK channel. The receiver receives a packet or the redundancy information in time slots of the traffic channel set in the downlink assignment information, and transmits an ACK/NACK in time slots of the ACK channel set in the uplink assignment information.

Referring to FIG. 9, the downlink and the uplink use different frequencies. Similarly, the downlink assignment information provides information about mapping between the assigned traffic channel and the ACK channel. The receiver receives a packet or the redundancy information in time slots of the traffic channel set in the downlink assignment information, and transmits an ACK/NACK in time slots of the ACK channel set in the uplink assignment information.

Figure 10:
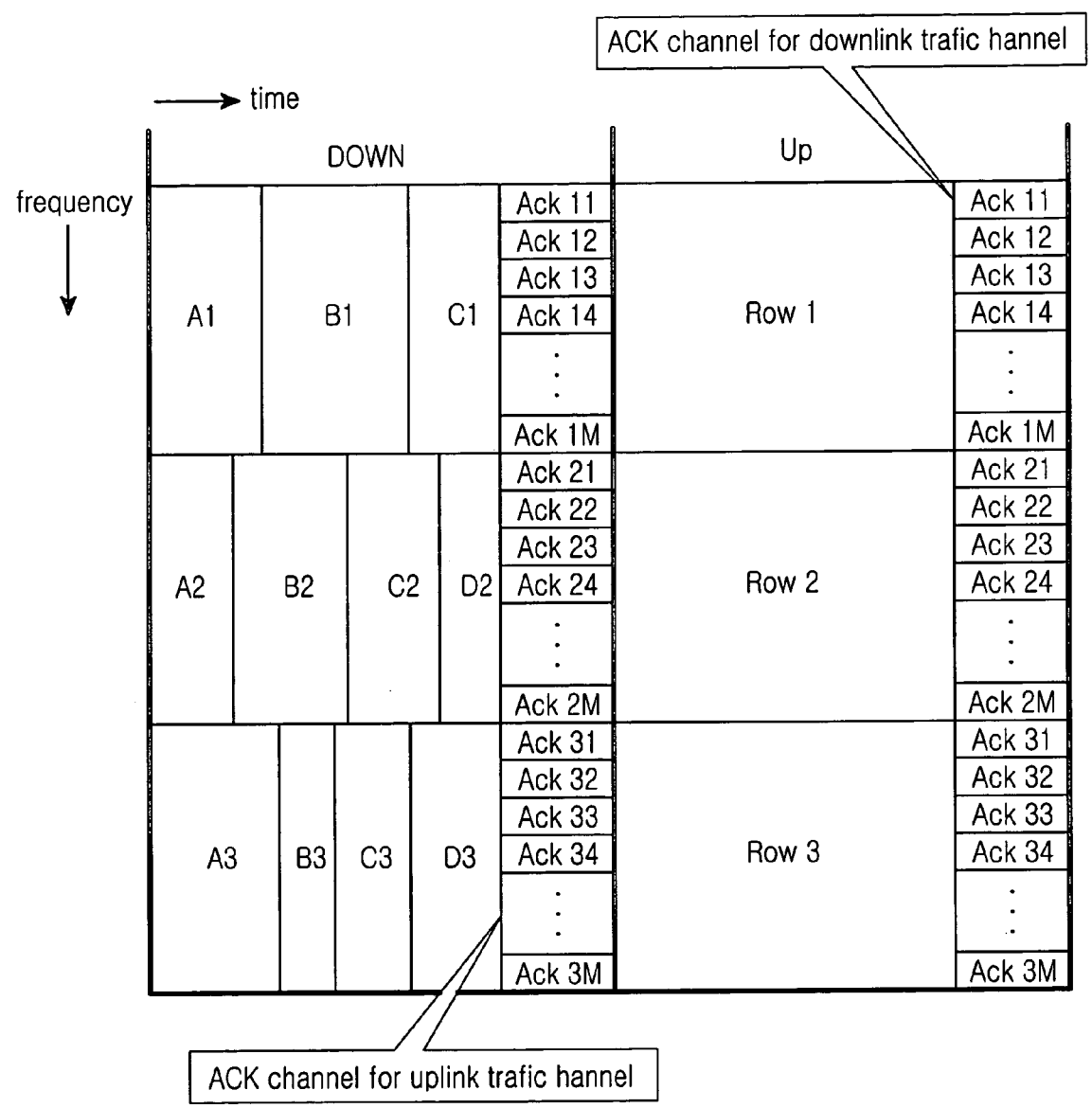
FIG. 10 is a diagram illustrating an embodiment of an OFDM frame structure containing information about mapping between a traffic channel and the ACK channel according to the present invention.

FIG. 10 illustrates an embodiment of an OFDM frame structure including mapping information between the traffic channel and the ACK channel. The OFDM system using a plurality of sub-carriers is shown by way of example. A vertical axis represents frequency and a horizontal axis represents time in the mapping information.

Referring to FIG. 10, each row has M sub-carriers and thus has N ACK channels, so that the channel mapping information is expressed as a square in the frequency-time domain. Each ACK channel uses one OFDM symbol and a traffic channel is mapped to an ACK channel in a corresponding row. The ACK channel is at the last position of the OFDM frame in time on the downlink and the uplink. Therefore, the receiver can earn time to transmit the ACK/NACK.

While an ACK channel is assigned at each transmission of traffic segments in the embodiment of the present invention, it can be further contemplated as another embodiment, that for fast ARQ, an MS, which receives a downlink packet, transmits an ACK/NACK on an uplink DCCH (Dedicated Control Channel) in an active state, and a BS, which receives uplink packets, transmits an ACK/NACK on a downlink common shared channel.

In this embodiment, the ACK/NACK is transmitted without being synchronized to traffic segments, which obviates the need for transmitting ACK channel assignment information in the transmitter. The receiver receives the ACK/NACK on a predetermined channel, that is, on the DCCH or the common shared channel. The ACK/NACK includes the ID of a corresponding packet so that the receiver can determine the packet for which the ACK/NACK is transmitted.

In accordance with the present invention as described above, redundancy information of a variable size is transmitted at each retransmission in HARQ Type II. Therefore, a QoS requirement is satisfied for each user and a data throughput is maximized. Also, an ACK/NACK can be efficiently received for the redundancy information of a variable size.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A hybrid automatic retransmission request (HARQ) method for transmitting packet data in a wireless communication system, comprising the steps of:
   (1) determining the size of redundancy information for correcting transmission errors in packet data, such that a packet blocking rate required to ensure a quality of service (QoS) class of the packet data is satisfied and a data throughput is maximized; and (2) transmitting the redundancy information of the determined size upon request for a retransmission of the packet data.

2. The HARQ method of claim 1, wherein step (1) comprises the steps of:
calculating a data throughput for a redundancy information size for each transmission number using the size of the packet data and an average transmission amount, and calculating a transmission failure rate for a redundancy information size for each transmission number using an error probability for each transmission number; and
determining the size of the redundancy information for each transmission number such that the data throughput is maximized and the transmission failure rate does not exceed the packet blocking rate required to ensure a QoS class of the packet data.

3. The HARQ method of claim 2, wherein the data throughput is calculated by $$\eta = \frac{k}{R_{\min} \cdot \alpha}$$
$$\alpha = x_1 + x_2 \cdot P(D_d^{x_1}) + x_3 \cdot P(D_d^{x_2}) \cdots x_N \cdot P(D_d^{x_{N-1}})$$

where $\eta$ is the data throughput, k is the size of the packet data, $R_{min}$ is the size of a minimum data unit, $x_i$ (i=1, 2, . . . , N) is the number of minimum data units at an $i_{th}$ transmission, N is a maximum transmission number, and $P(D_d^N)$ is a probability of detecting errors after transmitting a packet N times.

4. The HARQ method of claim 3, wherein the maximum transmission number is the ratio of D to RTT, D being an allowable time delay for the packet data and RTT being a round trip time between reception of an acknowledgement (ACK) or non-acknowledgement (NACK) for one transmitted packet data or transmitted redundancy information until the transmission of a next redundancy information or a new packet data.

5. The HARQ method of claim 4, wherein if the packet data or the redundancy information is transmitted in a time division multiplexing (TDD) method and an ACK or NACK for the packet data or the redundancy information is received in the TDD, the RTT is the sum of the length of a downlink frame, the length of an uplink frame, a downlink processing time, and an uplink processing time.

6. The HARQ method of claim 4, wherein if the packet data or the redundancy information is transmitted in a frequency division multiplexing (FDD) method and an ACK or NACK for the packet data or the redundancy information is received in the FDD, the RTT is at least greater than the sum of the transmission timing interval (TTI) of the ACK or NACK, propagation time, and processing time.

7. The HARQ method of claim 2, wherein the transmission failure rate is a probability of generating errors after transmitting the redundancy information a maximum number of times.

8. The HARQ method of claim 7, wherein the maximum transmission number is the ratio of D to RTT, D being an allowable time delay for the packet data and RTT being a round trip time between reception of an acknowledgement (ACK) or non-acknowledgement (NACK) for one transmitted packet data or transmitted redundancy information until the transmission of a next redundancy information or a new packet data.

9. The HARQ method of claim 8, wherein if the packet data or the redundancy information is transmitted in a time division multiplexing (TDD) method and an ACK or NACK for the packet data or the redundancy information is received in the TDD, the RTT is the sum of the length of a downlink frame, the length of an uplink frame, a downlink processing time, and an uplink processing time.

10. The HARQ method of claim 8, wherein if the packet data or the redundancy information is transmitted in a frequency division multiplexing (FDD) method and an ACK or NACK for the packet data or the redundancy information is received in the FDD, the RTT is at least greater than the sum of the transmission timing interval (TTI) of the ACK or NACK, propagation time, and processing time.

11. The HARQ method of claim 2, wherein the error probability for each transmission number is predetermined according to a channel condition and an encoding method used to transmit the packet data or the redundancy information.

12. The HARQ method of claim 1, further comprising the step of transmitting information related to the size of the redundancy information on a control channel.

13. The HARQ method of claim 12, further comprising the step of transmitting information related to an assignment of an ACK (acknowledgement) channel that delivers an ACK or a NACK (nonacknowledgment) for the transmitted redundancy information.

14. The HARQ method of claim 13, wherein the ACK channel assignment information includes information related to mapping between the redundancy information and the ACK or the NACK.

15. The HARQ method of claim 12, further comprising the step of receiving an ACK (acknowledgement) or a NACK (nonacknowledgment) for the redundancy information on a predetermined ACK channel.

16. A transmitting apparatus using hybrid automatic retransmission request (HARQ) for transmitting packet data in a wireless communication system, comprising:
a retransmission controller for determining a size of redundancy information for correcting transmission errors in packet data, such that a packet blocking rate required to ensure a quality of service (QoS) class of the packet data is satisfied and a data throughput is maximized; and
a transmitter for transmitting the redundancy information of the determined size upon request for a retransmission of the packet data.

17. The transmitting apparatus of claim 16, wherein the data throughput is calculated by $$\eta = \frac{k}{R_{\min} \cdot \alpha}$$
$$\alpha = x_1 + x_2 \cdot P(D_d^{x_1}) + x_3 \cdot P(D_d^{x_2}) \cdots x_N \cdot P(D_d^{x_{N-1}})$$

where $\eta$ is the data throughput, k is the size of the packet data, $R_{min}$ is the size of a minimum data unit, $x_i$ (i=1, 2, . . . , N) is the number of minimum data units at an $i^{th}$ transmission, N is a maximum transmission number, and $P(D_d^N)$ is a probability of detecting errors after transmitting a packet N times.

18. The transmitting apparatus of claim 17, wherein the maximum transmission number is the ratio of D to RTT, D being an allowable time delay for the packet data and RTT being a round trip time between reception of an acknowledgement (ACK) or non-acknowledgement (NACK) for one transmitted packet data or transmitted redundancy information until the transmission of a next redundancy information or a new packet data.

19. The transmitting apparatus of claim 16, wherein the retransmission controller calculates a transmission failure probability of generating errors after transmitting redundancy information a maximum number of times.

20. The transmitting apparatus of claim 16, wherein the maximum transmission number is the ratio of D to RTT, D being an allowable time delay for the packet data and RTT being a round trip time between reception of an acknowledgement (ACK) or non-acknowledgement (NACK) for one transmitted packet data or transmitted redundancy information until the transmission of a next redundancy information or a new packet data.

21. The transmitting apparatus of claim 16, wherein the transmitter transmits information related to the size of the redundancy information on a control channel.

22. The transmitting apparatus of claim 21, wherein the transmitter transmits information related to an assignment of an ACK (acknowledgment) channel that delivers an ACK or a NACK (nonacknowledgment) for the transmitted redundancy information.

23. The transmitting apparatus of claim 22, wherein the ACK channel assignment information includes information related to mapping between the redundancy information and the ACK or NACK.

24. The transmitting apparatus of claim 21, further comprising a receiver for receiving an ACK (acknowledgment) or a NACK (nonacknowledgment) for the redundancy information on a predetermined ACK channel.

* * * * *